US012650701B2

(12) United States Patent
Wegmann et al.

(10) Patent No.: US 12,650,701 B2
(45) Date of Patent: Jun. 9, 2026

(54) POSITION-BASED INITIATION OF AUTO UNLOADING OPERATION

(71) Applicant: Deere & Company, Moline, IL (US)

(72) Inventors: Riley J. Wegmann, Urbana, IA (US); William J. Vande Haar, Janesville, IA (US)

(73) Assignee: Deere & Company, Moline, IL (US)

( * ) Notice: Subject to any disclaimer, the term of this patent is extended or adjusted under 35 U.S.C. 154(b) by 362 days.

(21) Appl. No.: 18/593,132

(22) Filed: Mar. 1, 2024

(65) Prior Publication Data

US 2025/0278099 A1 Sep. 4, 2025

(51) Int. Cl.
G05D 1/661 (2024.01)
G05D 105/15 (2024.01)
(Continued)

(52) U.S. Cl.
CPC ......... G05D 1/663 (2024.01); G05D 2105/15 (2024.01); G05D 2107/21 (2024.01); G05D 2109/10 (2024.01)

(58) Field of Classification Search
CPC ............... G05D 1/663; G05D 2105/15; G05D 2107/21; G05D 2109/10; B65G 2201/042; B65G 2203/0283
See application file for complete search history.

(56) References Cited

U.S. PATENT DOCUMENTS 8,032,255 B2 10/2011 Phelan et al.
8,126,620 B2 2/2012 Ringwald et al.
(Continued)

FOREIGN PATENT DOCUMENTS

CA 2791436 A1 4/2014
DE 10064862 A1 7/2002
(Continued)

OTHER PUBLICATIONS

H. Kurita, M. Iida, M. Suguri, R. Uchida, H. Zhu and R. Masuda, "Application of image processing technology for unloading automation of robot combine harvester," 2011 IEEE/SICE International Symposium on System Integration (SII), Kyoto, Japan, 2011 , pp. 36-40 (Year: 2011).*

(Continued)

*Primary Examiner* — Russell Frejd
*Assistant Examiner* — Ana D Thomas
(74) *Attorney, Agent, or Firm* — Christopher J. Volkmann; KELLY, HOLT & CHRISTENSON PLLC

(57) ABSTRACT

A control system on a material transfer vehicle includes a path planning system that plans a path from the material transfer vehicle to a container, and a navigation system that navigates the material transfer vehicle along the navigation path. An auto unloading system automatically controls the material transfer vehicle as it approaches the container, positions itself closely proximate the container, and unloads material into the container. A handoff control system uses position-based criteria to determine when to switch from controlling the material transfer vehicle using the path planning system to controlling the material transfer vehicle using the auto unload system. The handoff control system generates a control signal triggering the auto unload system to begin controlling the material transfer vehicle when the position-based criteria are met.

20 Claims, 10 Drawing Sheets

(51) Int. Cl.
G05D 107/20 (2024.01)
G05D 109/10 (2024.01)

(56) References Cited

U.S. PATENT DOCUMENTS

| | | | |
|---|---|---|---|
| 8,380,401 B2 | 2/2013 | Pighi et al. | |
| 8,626,406 B2 | 1/2014 | Schleicher et al. | |
| 8,662,972 B2 | 3/2014 | Behnke et al. | |
| 8,755,976 B2 | 6/2014 | Peters et al. | |
| 8,868,304 B2 | 10/2014 | Bonefas | |
| 9,043,096 B2 | 5/2015 | Zielke et al. | |
| 9,049,817 B2 | 6/2015 | McCully et al. | |
| 9,119,342 B2 | 9/2015 | Bonefas | |
| 9,169,032 B2 | 10/2015 | Gengerke | |
| 9,185,845 B2 | 11/2015 | Van Mill et al. | |
| 9,187,259 B2 | 11/2015 | Van Mill et al. | |
| 9,272,853 B2 | 3/2016 | Van Mill et al. | |
| 9,392,746 B2 | 7/2016 | Darr et al. | |
| 9,457,971 B2 | 10/2016 | Bonefas et al. | |
| 9,529,364 B2 | 12/2016 | Foster et al. | |
| 9,545,048 B2 | 1/2017 | Pickett et al. | |
| 9,596,805 B2 | 3/2017 | Van Mill et al. | |
| 9,596,809 B2 | 3/2017 | Van Mill et al. | |
| 9,615,509 B2 | 4/2017 | Flickinger et al. | |
| 9,642,305 B2 | 5/2017 | Nykamp et al. | |
| 9,763,389 B2 | 9/2017 | Bump et al. | |
| 9,820,436 B2 | 11/2017 | Inoue et al. | |
| 9,861,040 B2 | 1/2018 | Bonefas | |
| 9,873,570 B2 | 1/2018 | Van Mill et al. | |
| 10,019,790 B2 | 7/2018 | Bonefas et al. | |
| 10,028,434 B2 | 7/2018 | Van Mill et al. | |
| 10,028,441 B2 | 7/2018 | Van Mill et al. | |
| 10,028,442 B1 | 7/2018 | Crosby | |
| 10,106,333 B2 | 10/2018 | Beaujot et al. | |
| 10,278,328 B2 | 5/2019 | Thomson et al. | |
| 10,292,327 B2 | 5/2019 | Ducroquet et al. | |
| 10,351,364 B2 | 7/2019 | Green et al. | |
| 10,406,961 B2 | 9/2019 | Grodecki et al. | |
| 10,750,668 B1* | 8/2020 | Minnich | A01D 43/087 |
| 10,760,946 B2 | 9/2020 | Meier et al. | |
| 10,765,063 B2 | 9/2020 | Van Mill et al. | |
| 10,807,812 B2 | 10/2020 | Thomson et al. | |
| 10,830,634 B2* | 11/2020 | Blank | G01G 19/086 |
| 11,008,177 B2 | 5/2021 | Banthia et al. | |
| 11,188,098 B2 | 11/2021 | Desai et al. | |
| 11,310,963 B2* | 4/2022 | Burnley | G05D 1/02 |
| 11,457,562 B2 | 10/2022 | Van Mill et al. | |
| 11,542,109 B2* | 1/2023 | Stander | B65G 67/04 |
| 11,803,188 B1 | 10/2023 | Gupta et al. | |
| 11,825,765 B2 | 11/2023 | Van Mill et al. | |
| 12,004,449 B2* | 6/2024 | Faust | G05D 1/223 |
| 12,013,702 B2* | 6/2024 | Stander | B60Q 9/008 |
| 12,317,777 B2* | 6/2025 | Apte | G05D 1/6987 |
| 12,344,260 B2* | 7/2025 | Appleton | A01B 69/008 |
| 12,439,853 B2* | 10/2025 | O'Connor | A01D 43/073 |
| 12,490,678 B2* | 12/2025 | O'Connor | A01D 41/1217 |
| 12,543,655 B2* | 2/2026 | Wegmann | A01D 90/10 |
| 2009/0321154 A1 | 12/2009 | Johnson | |
| 2011/0220677 A1 | 9/2011 | Bertolani | |
| 2013/0045067 A1 | 2/2013 | Pickett et al. | |
| 2013/0213518 A1 | 8/2013 | Bonefas | |
| 2015/0264866 A1* | 9/2015 | Foster | A01B 69/004 |
| | | | 414/21 |
| 2015/0327425 A1* | 11/2015 | Dillon | A01B 69/001 |
| | | | 701/41 |
| 2016/0251167 A1* | 9/2016 | Van Mill | B65G 67/04 |
| | | | 414/21 |
| 2018/0091946 A1 | 3/2018 | Venkatraman et al. | |
| 2018/0173221 A1 | 6/2018 | Samaraweera | |
| 2019/0092208 A1* | 3/2019 | Koenig | B60P 1/42 |
| 2019/0113624 A1 | 4/2019 | Robinson et al. | |
| 2019/0141899 A1 | 5/2019 | Winsnes et al. | |
| 2019/0277687 A1* | 9/2019 | Blank | B60W 30/18 |
| 2020/0064144 A1* | 2/2020 | Tomita | B62D 6/00 |
| 2020/0064826 A1 | 2/2020 | Engle et al. | |
| 2020/0068781 A1* | 3/2020 | Hershbarger | G05D 1/0276 |
| 2020/0128738 A1 | 4/2020 | Suleman et al. | |
| 2020/0353510 A1* | 11/2020 | Chandler | G01G 13/026 |
| 2021/0026362 A1* | 1/2021 | Wilson | B60Q 9/008 |
| 2021/0072764 A1* | 3/2021 | Kean | G06V 10/255 |
| 2021/0103880 A1 | 4/2021 | Wu | |
| 2021/0195840 A1* | 7/2021 | Puryk | A01D 90/10 |
| 2021/0294337 A1 | 9/2021 | Van Mill et al. | |
| 2021/0339729 A1* | 11/2021 | O'Connor | A01D 43/077 |
| 2022/0011444 A1 | 1/2022 | Eichhorn et al. | |
| 2022/0019240 A1 | 1/2022 | Christiansen et al. | |
| 2022/0071078 A1 | 3/2022 | Boyer et al. | |
| 2022/0083029 A1 | 3/2022 | Hunsaker et al. | |
| 2022/0304231 A1* | 9/2022 | Faust | G05D 1/0016 |
| 2022/0408641 A1 | 12/2022 | Van Mill et al. | |
| 2023/0029905 A1* | 2/2023 | Clark | B60W 50/14 |
| 2023/0276735 A1* | 9/2023 | Corban | G01G 15/006 |
| | | | 701/50 |
| 2023/0363311 A1* | 11/2023 | O'Connor | A01D 41/1275 |
| 2024/0032469 A1* | 2/2024 | Christiansen | A01D 41/1278 |
| 2024/0138312 A1* | 5/2024 | Wegmann | A01D 90/10 |
| 2024/0341232 A1* | 10/2024 | O'Connor | G06T 7/70 |
| 2024/0345583 A1* | 10/2024 | Wagh | G05D 1/689 |
| 2025/0275503 A1* | 9/2025 | Wegmann | A01B 69/004 |
| 2025/0278099 A1* | 9/2025 | Wegmann | G05D 1/663 |
| 2025/0321131 A1* | 10/2025 | Wegmann | A01D 34/008 |
| 2025/0321554 A1* | 10/2025 | Wegmann | G05B 19/041 |
| 2025/0359515 A1* | 11/2025 | Wonderlich | A01D 90/10 |

FOREIGN PATENT DOCUMENTS

| | | |
|---|---|---|
| DE | 112013000939 T5 | 11/2014 |
| DE | 102021208055 A1 | 3/2022 |
| DE | 102024116062 A1 | 1/2025 |
| DE | 102024123278 A1 | 4/2025 |
| EP | 4311411 A1 | 1/2024 |
| GB | 1104906 A | 3/1968 |
| JP | 2020135793 A2 | 8/2020 |
| WO | 2013025687 A1 | 2/2013 |
| WO | 2018102524 A1 | 6/2018 |
| WO | 2023150219 A1 | 8/2023 |

OTHER PUBLICATIONS

International Search Report and Written Opinion for application No. PCT/US2025/017365 dated May 12, 2025, 18 pages.

German Search Report issued in application No. 102024133840.7 dated Aug. 18, 2025, 08 pages.

1950 Dual Auger Grain Cart—Killbros Farm Equipment, retrieved from https://web.archive.org/web/20160203214035/https://www.killbrosequip.com/grain-carts/1950/, 2016, 8 pages.

Tumenjargal E., et al., "Development of ISO 11783 Compliant Agricultural Systems: Experience Report," Automotive Systems and Software Engineering, 2019, pp. 197-223.

* cited by examiner

POSITION-BASED INITIATION OF AUTO UNLOADING OPERATION

FIELD OF THE DESCRIPTION

The present description relates to agricultural equipment. More specifically, the present description relates to automatically controlling a grain cart during an unloading process.

BACKGROUND

There are a wide variety of different types of agricultural equipment. Some such agricultural equipment includes agricultural harvesters. Agricultural harvesters often engage crop, process that crop to obtain harvested material, and unload the harvested material into a material transfer vehicle such as a tractor-pulled grain cart.

Once the material transfer vehicle is filled to a desired fill level a propulsion vehicle (such as the tractor or other vehicle) pulls the grain cart to a container, such as a semi-trailer or other haulage vehicle. The propulsion vehicle approaches the semi-trailer, pulls along side the semi-trailer, and then engages an unloading auger on the grain cart to unload the harvested material from the grain cart into the semi-trailer.

The discussion above is merely provided for general background information and is not intended to be used as an aid in determining the scope of the claimed subject matter.

SUMMARY

A control system on a material transfer vehicle includes a path planning system that plans a path from the material transfer vehicle to a container, and a navigation system that navigates the material transfer vehicle along the navigation path. An auto unloading system automatically controls the material transfer vehicle as it approaches the container, positions itself closely proximate the container, and unloads material into the container. A handoff control system uses position-based criteria to determine when to switch from controlling the material transfer vehicle using the path planning system to controlling the material transfer vehicle using the auto unload system. The handoff control system generates a control signal triggering the auto unload system to begin controlling the material transfer vehicle when the position-based criteria are met.

Example 1 is a method of controlling a material transfer vehicle, the method comprising:

controlling the material transfer vehicle with a navigation system based on a navigation path generated by a path planning system;

computing a position-based parameter indicative of a characteristic of a position of the material transfer vehicle relative to a container;

generating a handoff signal to handoff control of the material transfer vehicle to an auto unloading system based on a value of the position-based parameter; and controlling an unloading operation of the material transfer vehicle with the auto unloading system to automatically transfer material from the material transfer vehicle to a container based on the handoff signal.

Example 2 is the method of any or all previous examples wherein generating a handoff signal comprises:

comparing the value of the position-based parameter to a threshold value to generate a comparison result;

determining whether a handoff criterion is met based on the comparison result; and if the handoff criterion is met, generating the handoff signal to trigger the auto unloading system to begin controlling the material transfer vehicle.

Example 3 is the method of any or all previous examples wherein computing the position-based parameter comprises:

detecting a path-based distance indicative of a distance remaining along the navigation path between the material transfer vehicle and the container.

Example 4 is the method of any or all previous examples wherein generating the handoff signal comprises:

comparing the path-based distance to a path-based distance threshold to generate the comparison result;

determining that the handoff criterion is met when the comparison result indicates that the path-based distance meets the path-based distance threshold; and generating the handoff signal to trigger the auto unloading system to begin controlling the material transfer vehicle.

Example 5 is the method of any or all previous examples wherein computing the position-based parameter comprises:

detecting a straight line distance indicative of a distance between the material transfer vehicle and the container along a straight line.

Example 6 is the method of any or all previous examples wherein generating the handoff signal comprises:

comparing the straight line distance to a straight line distance threshold to generate the comparison result;

determining that the handoff criterion is met when the comparison result indicates that the straight line distance meets the straight line distance threshold; and generating the handoff signal to trigger the auto unloading system to begin controlling the material transfer vehicle.

Example 7 is the method of any or all previous examples wherein computing the position-based parameter comprises:

detecting a travel time value indicative of a remaining travel time between the material transfer vehicle and the container along the navigation path.

Example 8 is the method of any or all previous examples wherein generating the handoff signal comprises:

comparing the travel time value to a travel time threshold to generate the comparison result;

determining that the handoff criterion is met when the comparison result indicates that the travel time value meets the travel time threshold; and generating the handoff signal to trigger the auto unloading system to begin controlling the material transfer vehicle.

Example 9 is the method of any or all previous examples wherein computing the position-based parameter comprises:

detecting a position of the material transfer vehicle.

Example 10 is the method of any or all previous examples wherein generating the handoff signal comprises:

comparing the position of the material transfer vehicle to a predefined location to generate the comparison result;

determining that the handoff criterion is met when the comparison result indicates that the position of the material transfer vehicle is within a threshold distance of the predefined; and generating the handoff signal to trigger the auto unloading system to begin controlling the material transfer vehicle.

Example 11 is the method of any or all previous examples wherein generating the handoff signal comprises:

comparing the position of the material transfer vehicle to a boundary of a predefined unloading zone to generate the comparison result;

determine that the handoff criterion is met when the position of the material transfer vehicle is within the boundary of the predefined unloading zone based on the comparison result;

generating the handoff signal to trigger the auto unloading system to begin controlling the material transfer vehicle.

Example 12 is an agricultural system, comprising:

a navigation system on a material transfer vehicle configured to receive a navigation path and control the material transfer vehicle based on a navigation path;

an auto unloading system configured to control an unloading operation of the material transfer vehicle to automatically transfer material from the material transfer vehicle to a container;

a position parameter computation processor configured to compute a position-based parameter indicative of a characteristic of a position of the material transfer vehicle relative to the container; and a handoff signal generator configured to generate a handoff signal to trigger the navigation system and the auto unloading system to control the material transfer vehicle based on the position-based parameter.

Example 13 is the agricultural system of any or all previous examples and further comprising:

a comparison system configured to compare a value of the position-based parameter to a threshold value to generate a comparison result, wherein the handoff signal generator is configured to determine whether a handoff criterion is met based on the comparison result, and if the handoff criterion is met, generating the handoff signal to trigger the auto unloading system to begin controlling the material transfer vehicle.

Example 14 is the agricultural system of any or all previous examples wherein the position parameter computation processor comprises:

a path distance calculator configured to detect a path-based distance indicative of a distance remaining along the navigation path between the material transfer vehicle and the container and wherein the comparison system is configured to compare the path-based distance to a path-based distance threshold to generate the comparison result, wherein the handoff signal generator is configured to determine that the handoff criterion is met when the comparison result indicates that the path-based distance meets the path-based distance threshold.

Example 15 is the agricultural system of any or all previous examples wherein the position parameter computation processor comprises:

a straight line distance calculator configured to detect a straight line distance indicative of a distance between the material transfer vehicle and the container along a straight line, wherein the comparison system is configured to compare the straight line distance to a straight line distance threshold to generate the comparison result and wherein the handoff signal generator is configured to determine that the handoff criterion is met when the comparison result indicates that the straight line distance meets the straight line distance threshold.

Example 16 is the agricultural system of any or all previous examples wherein the position parameter computation processor comprises:

a travel time calculator configured to detect a travel time value indicative of a remaining travel time between the material transfer vehicle and the container along the navigation path, wherein the comparison system is configured to compare the travel time value to a travel time threshold to generate the comparison result, and wherein the handoff signal generator is configured to determine that the handoff criterion is met when the comparison result indicates that the travel time value meets the travel time threshold.

Example 17 is the agricultural system of any or all previous examples wherein the position parameter computation processor comprises:

a location identifier configured to detect a position of the material transfer vehicle and a predefined location wherein the comparison system is configured to compare the position of the material transfer vehicle to a predefined location to generate the comparison result, wherein the handoff signal generator is configured to determine that the handoff criterion is met when the comparison result indicates that the position of the material transfer vehicle is within a threshold distance of the predefined.

Example 18 is the agricultural system of any or all previous examples wherein the position parameter computation processor comprises:

a zone identifier configured to detect a position of the material transfer vehicle and a boundary of a predefined loading zone, wherein the comparison system is configured to compare the position of the material transfer vehicle to the boundary of the predefined unloading zone to generate the comparison result, wherein the handoff signal generator is configured to determine that the handoff criterion is met when the position of the material transfer vehicle is within the boundary of the predefined unloading zone.

Example 19 is a material transfer vehicle, comprising:

a propulsion subsystem;

a steering subsystem;

an unloading conveyor;

a path planning system configured to generate a travel path from the material transfer vehicle to an unloading location;

a navigation system configured to receive the travel path and control the propulsion subsystem and the steering subsystem based on a navigation path;

an auto unloading system configured to control the propulsion subsystem, the steering subsystem, and the unloading conveyor to automatically transfer material from the material transfer vehicle to a container;

a position parameter computation processor configured to compute a position-based parameter indicative of a characteristic of a position of the material transfer vehicle relative to the container; and a handoff signal generator configured to generate a handoff signal to trigger one of the navigation system and the auto unloading system to control the material transfer vehicle based on the position-based parameter.

Example 20 is the material transfer vehicle of any or all previous examples and further comprising:

a comparison system configured to compare a value of the position-based parameter to a threshold value to generate a comparison result, wherein the handoff signal generator is configured to determine whether a handoff criterion is met based on the comparison result, and if the handoff criterion is met, generating the handoff signal to trigger the auto unloading system to begin controlling the material transfer vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is common for a material transfer vehicle, such as a tractor-pulled grain cart, to transfer harvested material from a harvester to a container, such as a haulage vehicle (e.g., a semi-trailer). Some current control systems on material transfer vehicles include a path planning system that plans a path from a location of the material transfer vehicle to an estimated location of the container. A navigation system automatically navigates the material transfer vehicle along the navigation path. An auto unloading system can control the material transfer vehicle to automatically unload the material from the grain cart into the container. By automatically, it is meant that, in one example, the operation or function can be performed without further human involvement except, perhaps, to initiate or authorize the operation or function.

In order to control the material transfer vehicle to automatically unload material into the container, the auto unloading system may use on-board sensors to detect the precise location and pose of the container. Using that location and pose, the auto unloading system can control the propulsion and steering subsystems on the material transfer vehicle to move the material transfer vehicle along side the container so that the material can be unloaded, such as by using an auger and spout. The auto unloading system controls the material transfer vehicle to move along the container so that a relatively even fill (or another desired fill pattern) can be achieved when transferring material from the material transfer vehicle into the container. However, it can be difficult to known when to switch between controlling the material transfer vehicle using the path planning system and controlling the vehicle using the auto unloading system.

The present description thus describes a system in which a handoff control system detects and processes position-based criteria in order to determine when to hand control off from the path planning system to the auto unloading system. The handoff control system can use the distance between the material transfer vehicle and the container, measured along the navigation path, as the position-based criterion. The handoff control system can also use a straight-line distance between the material transfer vehicle and the container, regardless of the navigation path as the position-based criterion. The handoff control system can use an estimated travel time along the navigation path as the position-based criterion. The control system can use a predefined unloading zone as the position-based criterion. The handoff control system can also use a predefined point or a predefined location as the position-based criterion.

Figure 1:
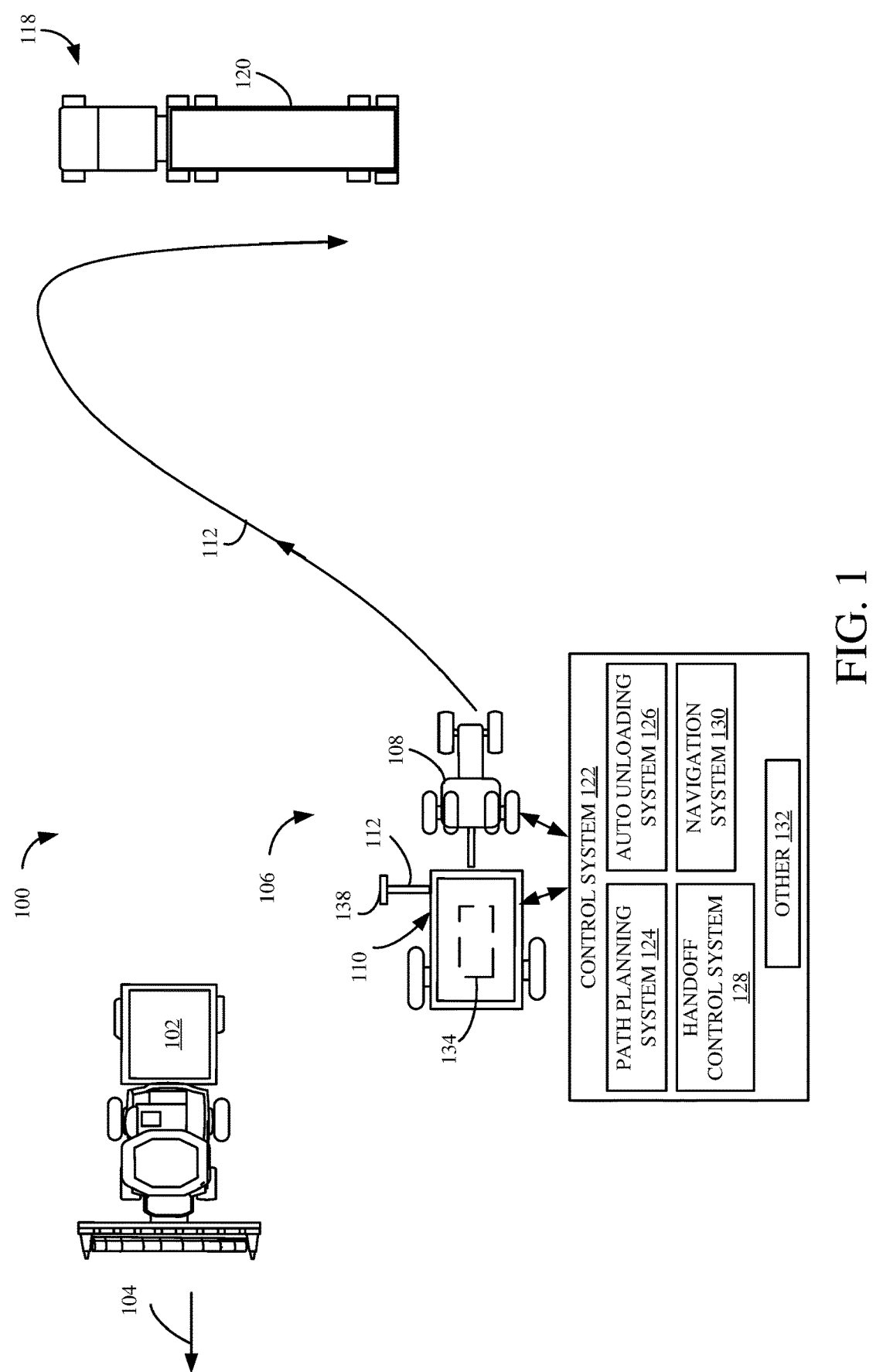
FIG. 1 is a partial pictorial, partial block diagram of an agricultural system.

FIG. 1 is a partial pictorial, partial block diagram of an agricultural system 100 in which a harvester 102 is moving through a field in the direction indicated by arrow 104 and harvesting crop. The crop can be unloaded from harvester 102 into material transfer vehicle 106. In the example shown in FIG. 1, material transfer vehicle 106 includes a towing vehicle 108 (such as a tractor or other towing vehicle) and a grain cart 110. Once grain cart 110 is filled to a desired level with harvested material from harvester 102, material transfer vehicle 106 travels along a navigation path indicated by arrow 112 to position itself along side a container 118 which may include a semi-trailer 120, or another container.

FIG. 1 also shows that agricultural system 100 can include a control system 122 which may be disposed on towing vehicle 108, on grain cart 110, in a remote server environment, or distributed among a plurality of different locations. Control system 102 includes path planning system 124, auto unloading system 126, handoff control system 128, navigation system 130, and other items 132. Until position-based criteria are met, path planning system 124 calculates and updates the path 112 between material transfer vehicle 106 and container 118. Navigation system 130 automatically navigates material transfer vehicle 106 to travel along the navigation path 112. During that navigation, handoff control system 128 determines whether position-based handoff criteria (also referred to as position-based criterion or handoff criteria) are met and, if so, generates a handoff control signal to control auto unloading system 126 to begin controlling material transfer vehicle 106, instead of path planning system 124 and navigation system 130. It will be appreciated that some portions of navigation system 130 may continue to control material transfer vehicle 106 under the control of auto unloading system 126, once a handoff takes place or auto unloading system 126 can control material transfer vehicle 126 without using navigation system 130.

Once material transfer vehicle 106 is under the control of auto unloading system 126, auto unloading system 126 controls material transfer vehicle 106 to move along side trailer 120. Grain cart 110 may include a gate 134 at its lower end that can be opened and closed to allow material from grain cart 110 to move into a hopper or other collection structure where the material can be transferred by an auger 136 and spout 138 into semi-trailer 120. Therefore, once auto unloading system 126 has controlled material transfer vehicle 106 to come into a position next to semi-trailer 120, auto unloading system 126 can control material transfer vehicle 106 to engage a power takeoff to drive auger 136, and to open gate 134 to allow material to be transferred from grain cart 110 into semi-trailer 120 using auger 136 and spout 138. Auto unloading system 126 continues to move material transfer vehicle 106 along trailer 120, to obtain a desired fill level in semi-trailer 120. Auto unloading system 126 can also control the movement of material transfer vehicle 106 to unload material according to a predefined fill pattern (such as a front-to-back fill pattern, a back-to-front fill pattern, a multi-pass fill pattern, etc.).

Figure 2:
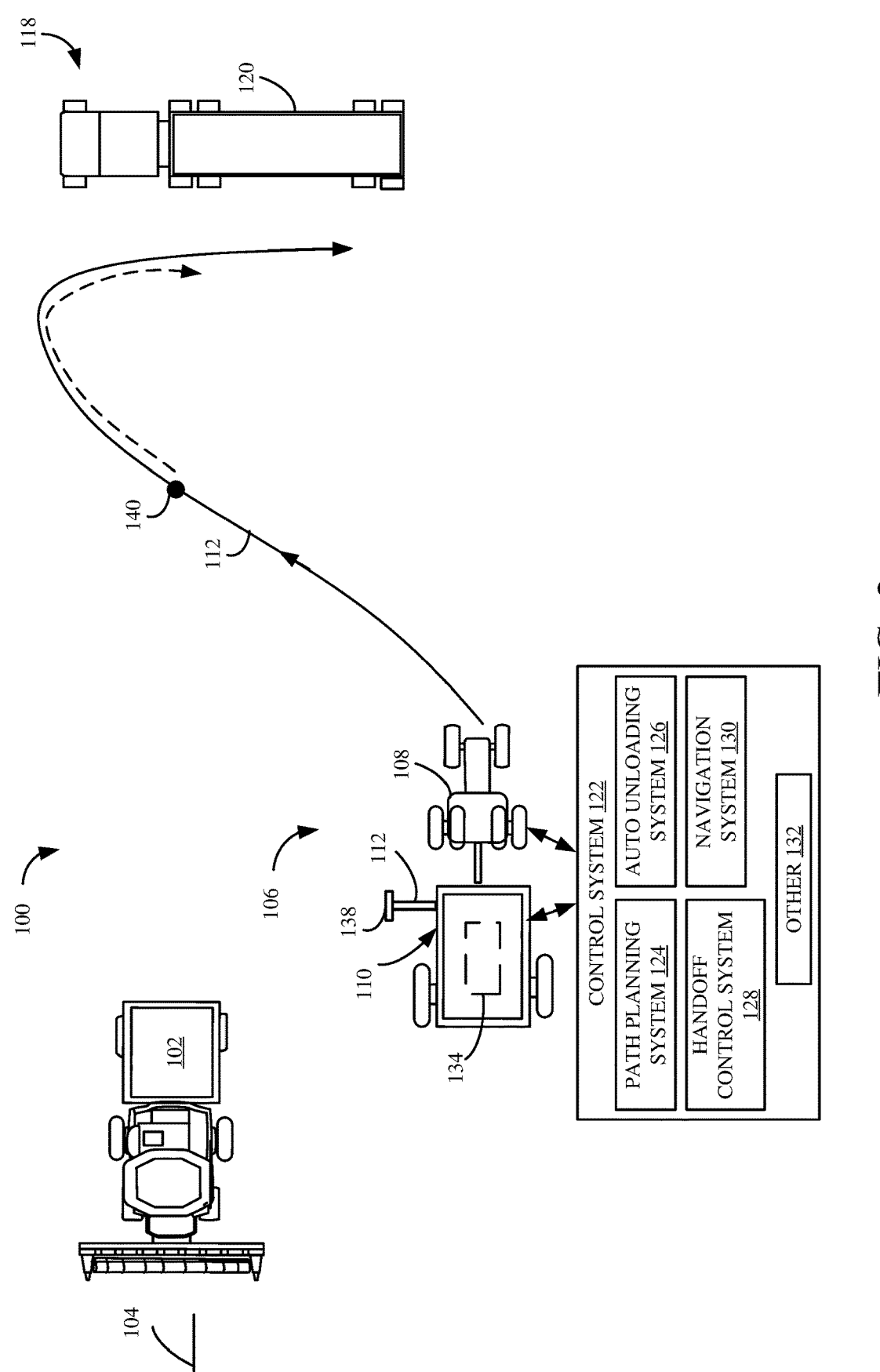
FIG. 2 is a partial pictorial, partial block diagram of an agricultural system using a path-based distance as a position-based handoff criterion.

In order to generate the handoff control signal, handoff control system 128 first computes a positioned-based criterion and then determines whether that criterion indicates that a handoff from path planning system 124 and navigation system 130 to auto unloading system 126 should take place. FIG. 2 shows one example in which handoff control system 128 uses, as the position-based criterion, the distance remaining between material transfer vehicle 106 and container 118 along navigation path 112. In FIG. 2, handoff control system 128 computes the distance along travel path 112 between material transfer vehicle 106 and container 118. Once that distance reaches a threshold level (which may be represented in FIG. 2 as the distance between point 140 and container 118 on travel path 112, then handoff control system 128 determines that the handoff criterion are met and generates a handoff control signal that hands off control of material transfer vehicle 106 from path planning system 124 and navigation system 130, to auto unloading system 126. Again, it will be appreciated that whenever auto unloading system 126 is controlling material transfer vehicle 106, portions of navigation system 130 may be used as well. However, those portions of navigation system 130 will be under the control of auto unloading system 126.

Figure 3:
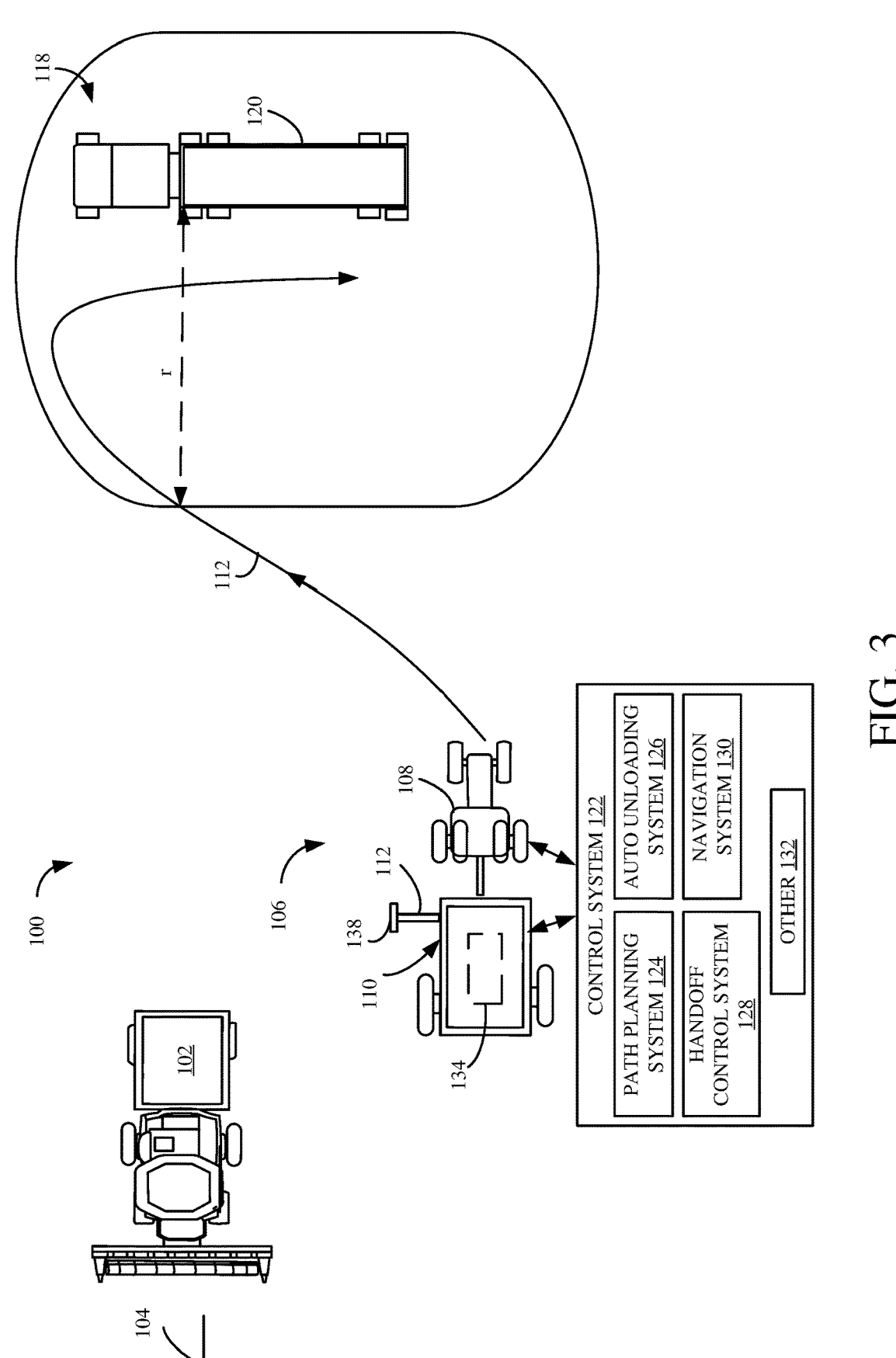
FIG. 3 is a partial pictorial, partial block diagram of an agricultural system using straight-line distance as a position-based handoff criterion.

In another example, illustrated in FIG. 3, handoff control system 128 may use, as the position-based criterion, the straight-line distance between material transfer vehicle 106 and container 118. FIG. 3 shows that, from a predetermined location on container 118, a circle of radius r is drawn around container 118. Once material transfer vehicle 106 comes within the distance r of container 118, then handoff control system 128 determines that the position-based criterion are met and that control of material transfer vehicle 106 should be handed off to auto unloading system 126. This may be done, for example, when the sensors on-board material transfer vehicle 106 have a high enough accuracy to adequately control material transfer vehicle 106 once those sensors are close enough to (e.g., within distance r of) container 118.

Figure 4:
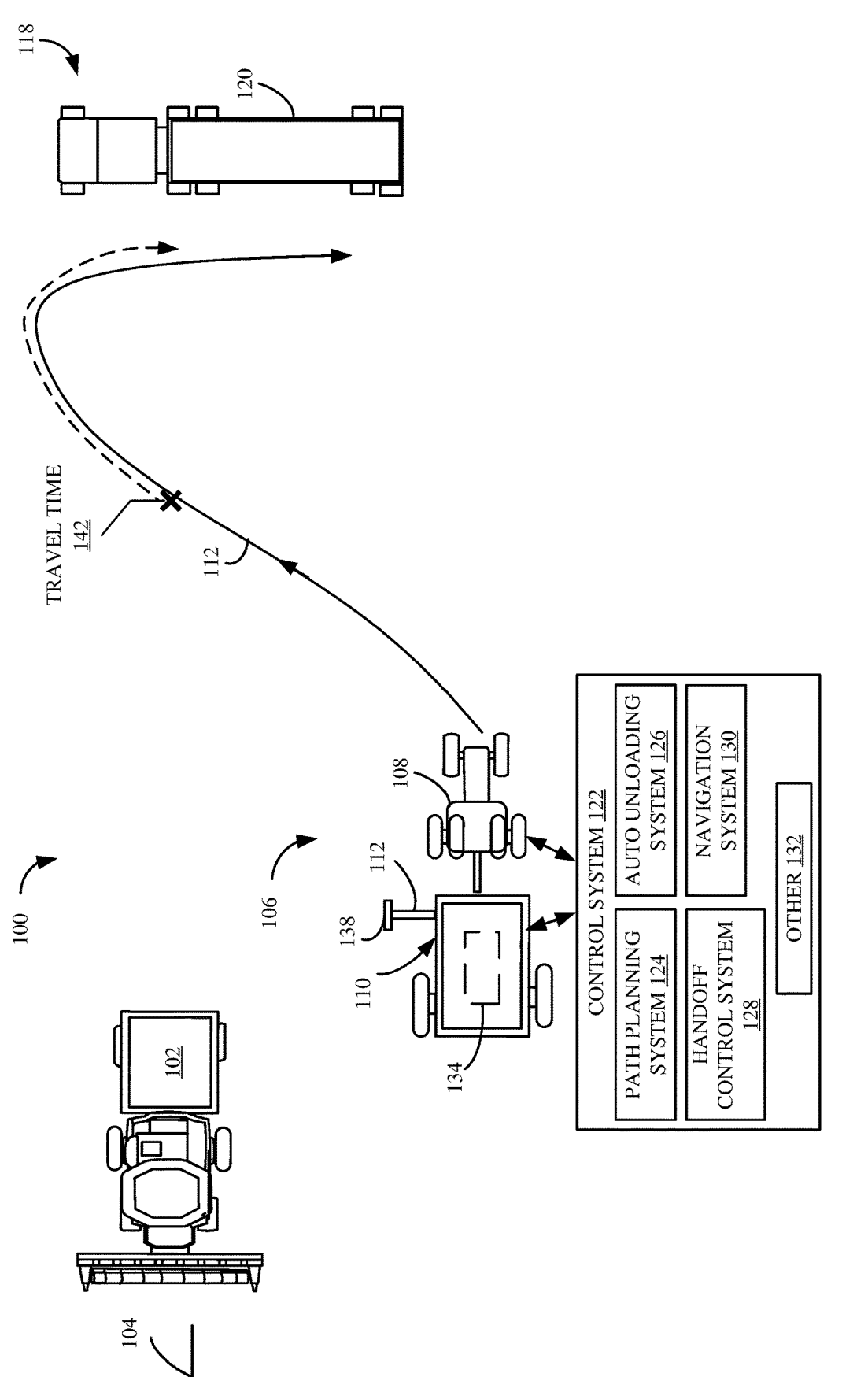
FIG. 4 is a partial pictorial, partial block diagram of an agricultural system using travel time as a position-based handoff criterion.

FIG. 4 illustrates an architecture in which handoff control system 128 uses travel time as the position-based criterion in order to determine whether control should be handed off to auto unloading system 126. By way of example, handoff control system 128 may receive a sensor signal indicative of a current travel speed of material transfer vehicle 106 as well as a signal indicative of the remaining distance long path 112 between material transfer vehicle 106 and container 118. Using those parameters, and perhaps an expected speed of material transfer vehicle 106 along the remainder of path 112, handoff control system 128 computes an estimated travel time remaining for material transfer vehicle 106 to travel to an unloading position proximate container 118. When that travel time reaches a threshold value (as illustrated by the X 142 in FIG. 4) then handoff control system 128 determines that the position-based criterion is met and that control should be handed off to auto unloading system 126.

Figure 5:
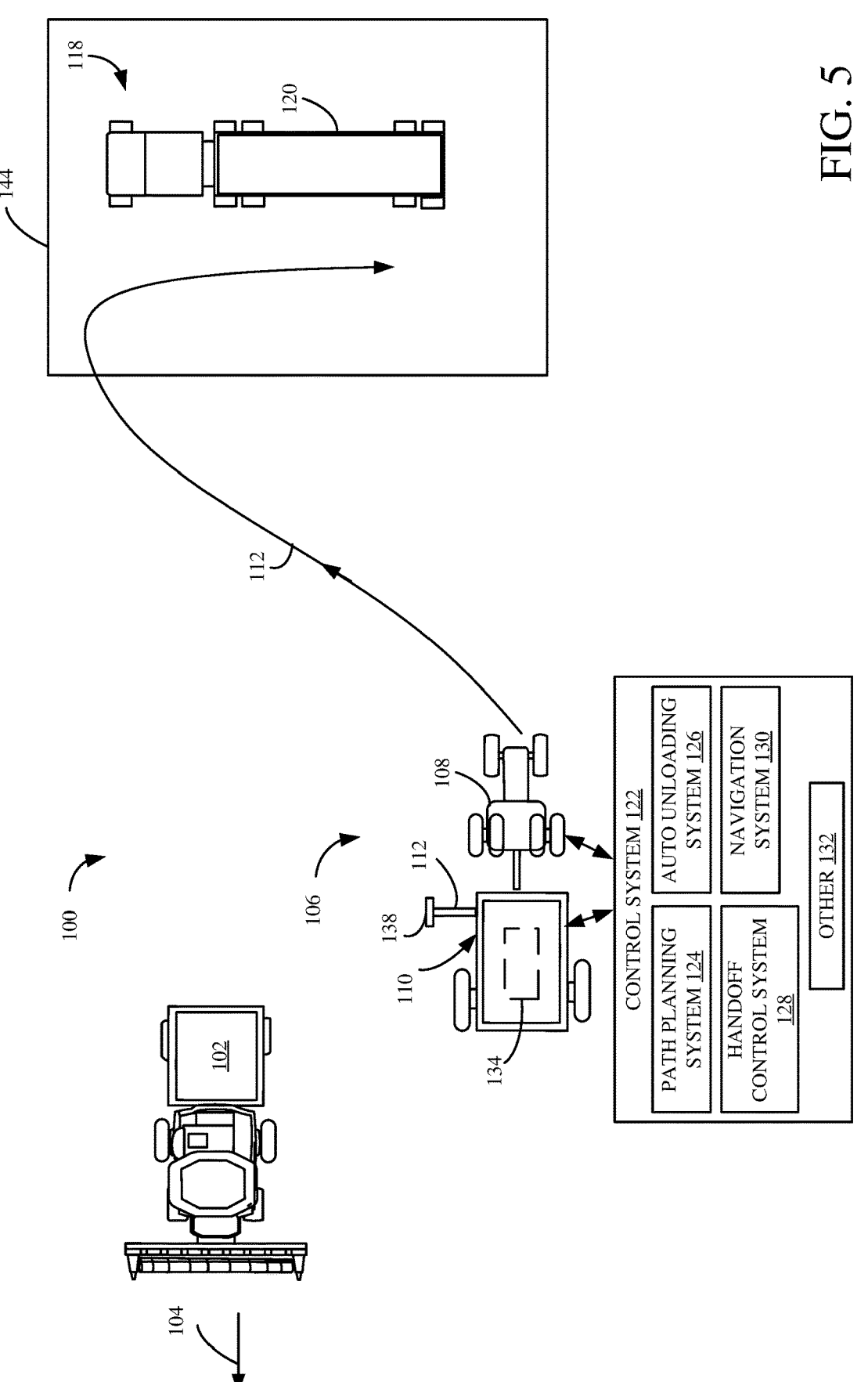
FIG. 5 is a partial pictorial, partial block diagram of an agricultural system using a predefined unloading zone as a position-based handoff criterion.

FIG. 5 shows an example in which handoff control system 128 uses a predefined (or dynamically generated) loading zone 144 to determine whether the position-based criterion is met. For instance, loading zone 144 may be pre-marked on a map that is accessed by handoff control system 128. In another example, loading zone 144 may be automatically or manually generated on a map once the location of container 118 is identified. Regardless of how loading zone 144 is generated, handoff control system 128 can determine that, when material transfer vehicle 106 is within the boundaries of loading zone 144, then the position-based criterion is met and control of material transfer vehicle 106 should be handed off to auto unloading system 126.

Figure 6:
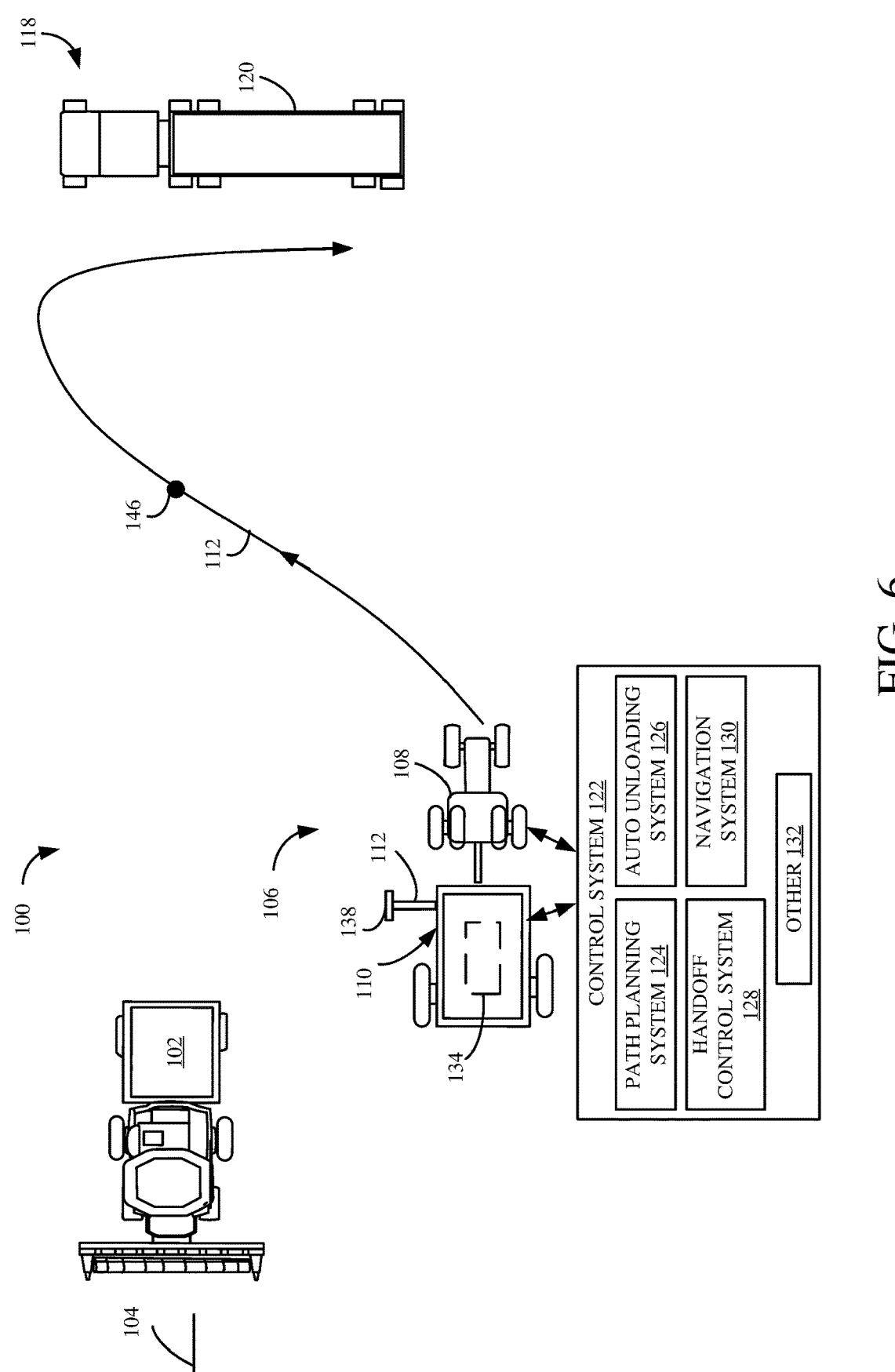
FIG. 6 is a partial pictorial, partial block diagram of an agricultural system using a predefined location as a position-based handoff criterion.

FIG. 6 shows an example in which handoff control system 128 uses a predefined location 146 as the position-based criterion. The predefined location 146 may be a point in a coordinate system, or a larger area within a coordinate system. The location of the predefined location 146 can be manually generated, or automatically generated. The position of predefined location 146 may be based on a known or estimated position of container 118, or it may be generated in other ways. Handoff control system 128 determines when material transfer vehicle 106 reaches (or is within a threshold distance of) the predefined location 146. When that happens, then handoff control system 128 determines that the position-based criterion is met and that control should be handed off to auto unloading system 126.

Figure 7:
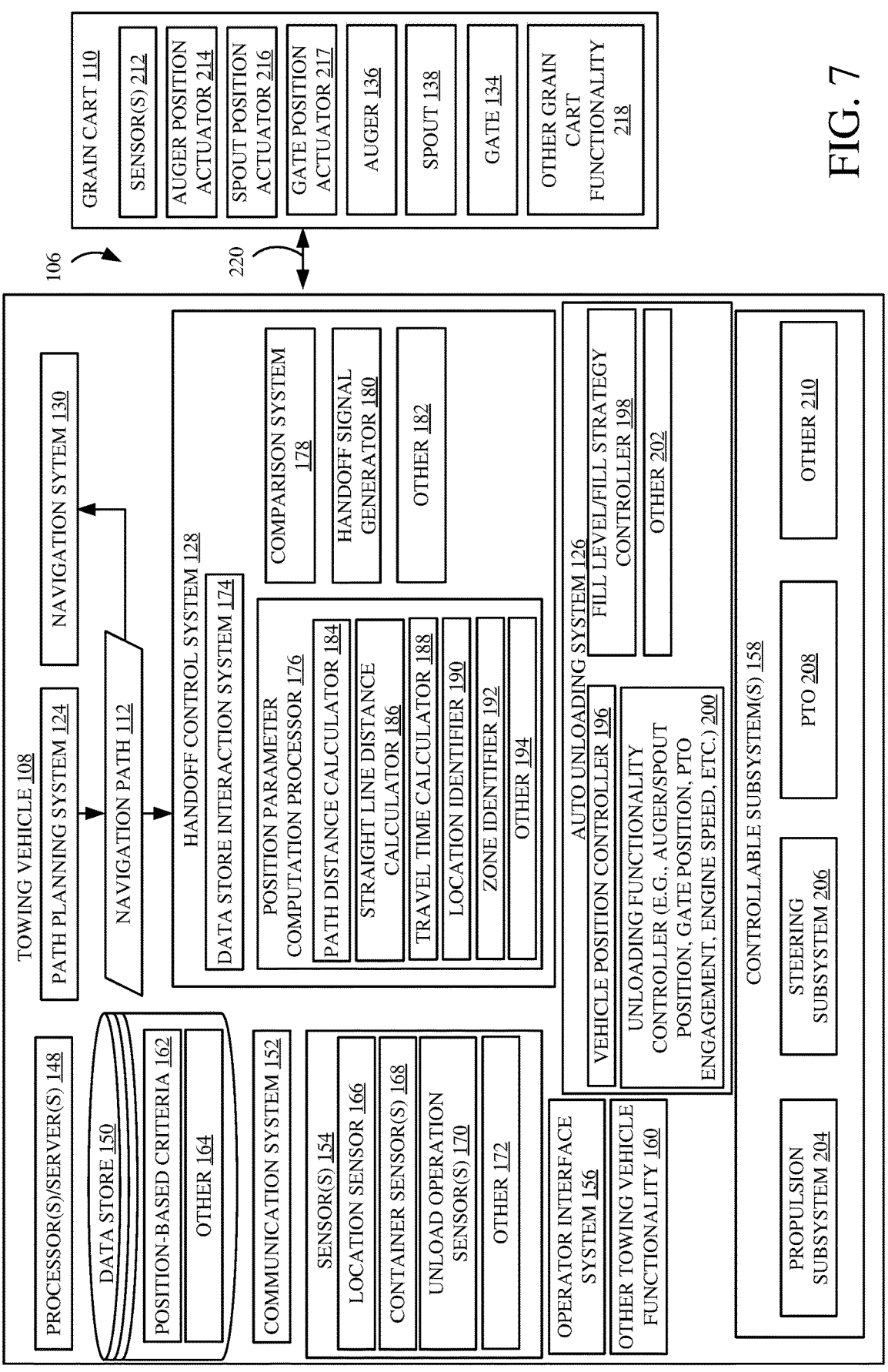
FIG. 7 is a block diagram showing one example of a material transfer vehicle in more detail.

FIG. 7 is a block diagram of one example of material transfer vehicle 106, in more detail. In the example shown in FIG. 7, towing vehicle 108 includes one or more processors or servers 148, data store 150, communication system 152, sensors 154, operator interface system 156, path planning system 124, handoff control system 128, auto unloading system 126, navigation system 130, controllable subsystems 158, and other towing vehicle functionality 160. Data store 150 can include distance-related criteria 162 and other items 164. Sensors 154 can include location sensor 166, one or more container sensors 168, one or more unload operation sensors 170, and other sensors 172. Handoff control system 128 can include data store interaction system 174, position parameter computation processor 176, comparison system 178, handoff signal generator 180, and other items 182. Position parameter computation processor 176 can include path distance calculator 184, straight line distance calculator 186, travel time calculator 188, location identifier 190, zone identifier 192, and other items 194. Auto unloading system 126 can include vehicle position controller 196, fill level/fill strategy controller 198, unloading functionality controller (e.g., auger/spout position controller, gate position controller, PTO engagement controller, engine speed controller, etc.) 200, and other items 202. Controllable subsystems 158 can include propulsion subsystem 204, steering subsystem 206, power take off (PTO) 208, and other controllable subsystems 210.

In the example shown in FIG. 7, grain cart 110 can include one or more sensors 212, auger position actuator 214, spout position actuator 216, auger 136, spout 138, gate 134, and other grain cart functionality 218.

FIG. 7 also shows that towing vehicle 108 can be connected to grain cart 110 by a link 220. Link 220 can be a mechanical link, a link that transfers mechanical power, electrical power, pneumatic power, hydraulic power, or other power. Link 220 can also be a communication link that is used for communication between towing vehicle 108 and grain cart 110. Link 220 can include a wired link, a wireless link or other link as well.

Before describing the operation of handoff control system 128 in more detail, a description of some of the items on material transfer vehicle 106 and their operation will first be provided. The position-based criterion 162 can identify the type of position-based criterion that handoff control system 128 will use (such as any of those described above with respect to FIGS. 1-6 or other criteria). The position-based criterion 162 can also include the values for those criteria (such as the path-based distance, the straight-line distance r, the travel time, the location of the unloading zone 144, the specific location 146, or the value of another position-based criterion).

Communication system 152 can be used to facilitate communication of the items of towing vehicle 108 and grain cart 100 with one another. Therefore, communication system 152 can be a controller area network (CAN) bus and bus controller. Communication system 152 can also facilitate communication between towing vehicle 108 and other machines, other systems, etc. Therefore, communication system 152 can be a cellular communication system, a wide area network communication system, a local area network communication system, a near field communication system, a Bluetooth or wifi communication system, among any other communication systems or combinations of communication systems.

Sensors 154 sense variables and provide sensor signals indicative of the sensed variables. Location sensor 166 senses the location of sensor 166 in a global or local coordinate system. Therefore, location sensor 166 can be a global navigation satellite system (GNSS) receiver, a dead reckoning system, a cellular triangulation system, or another location sensor. Container sensors 168 can be sensors that sense the location and pose of container 118. The container sensors 168 may have a sensor range that is defined by the particular sensor. Container sensors 168 can include optical sensors (such as a stereo camera with an image processing system), a RADAR sensor, a LIDAR sensor, an ultra wide-band sensor, an ultrasound sensor, among other sensors. Unload operation sensors 170 sense variables that are used by auto unloading system 126 to automatically control material transfer vehicle 106 to perform an auto unloading operation. Therefore, unload operation sensors 170 may include optical sensors or other sensors that sense the fill level of material in container 118, as material is being unloaded from grain cart 110 into container 118. Unload operation sensors 170 may also sense the landing point of material in container 118, as it is being transferred through auger 136 and spout 138. The landing point can be used to adjust spout 138 to change the trajectory of material as it is exiting auger 136 and entering container 118. Unload sensors 170 can include weight sensors, volume sensors, or any of a wide variety of other sensors that may be used by auto unloading system 126.

Operator interface system 156 may include operator interface mechanisms, such as a steering wheel, joy sticks, pedals, levers, linkages, display screens, touch sensitive screens, actuatable elements on display screens (such as icons, links, buttons, etc.), a speaker, a microphone (such as where speech recognition and/or speech synthesis are provided) among any of a wide variety of other audio, visual, and/or haptic mechanisms that can be used to generate outputs for an operator and receive inputs from an operator. The operator may be a human operator or an automated or semi-automated system.

Path planning system 124 can receive an input from location sensor 166 indicative of a location of vehicle 108, as well as an input indicative of a location of container 118. The location of container 118 may be estimated, or communicated over communication system 152 from container 118, itself. For instance, if container 118 has a GNSS receiver, the location identified by the GNSS receiver on container 118 can be transmitted to path planning system 124 using communication system 152. Path planning system 124 generates and updates a navigation path 112 between the current location of towing vehicle 108 and container 118. Path planning system 124 can implement any of a wide variety of path planning algorithms, such as grid-based search algorithms, sampling-based search algorithms, trajectory optimization algorithms, among others.

Navigation path 112 is provided to navigation system 130 which generates control signals to control the propulsion subsystem 204 and steering subsystem 206 of towing vehicle 208 in order to navigate towing vehicle 108 along the navigation path 112. Navigation system 130 receives inputs, such as from location sensor 166 and other perception inputs and generates control signals to control propulsion system 204 and steering subsystem 206 to navigate towing vehicle 108 along the navigation path 112.

In auto unloading system 126, vehicle position controller 196 controls the position of towing vehicle 108 relative to container 118, based upon inputs from container sensors 168 and possibly other inputs. Vehicle position controller 196 thus controls towing vehicle 108 to bring grain cart 110 along side container 118, and sufficiently close to container 118 that material can be transferred from grain cart 110 into container 118 by auger 136 and spout 138. Unloading functionality controller 200 generates control signals to control various items of unloading functionality during an automated unload operation. For instance, unloading functionality controller 200 can control auger position actuator 214 and spout position actuator 216 to move auger 136 and spout 138 from a transport position to a deployed, unload position. Unload functionality controller 200 can also control PTO 208 to engage the PTO, and unloading functionality controller 200 can control the engine speed of towing vehicle 108 to thus change the rate at which material is transferred from grain cart 110 to container 118. Further, unloading functionality controller 200 can generate control signals to control gate position actuator 217 to control the position of gate 134 between its open position and closed position.

Fill level/fill strategy controller 198 can also receive an input from a fill level sensor (e.g., one of unload operation sensors 170 which may be an optical sensor mounted on auger 136 or elsewhere with a field of view inside container 118). Fill level/fill strategy controller 198 calculates an estimated fill level at a current material landing point in container 118. When that fill level reaches a desired fill level, then vehicle position controller 196 can nudge towing vehicle 108 forward relative to container 118 to change the landing point of the material inside container 118 to a point that has yet to be filled (or that has an insufficient fill level). Also, in one example, unloading functionality controller 200 can control the position of auger 136 and spout 138 to change the landing point of material in container 118 as well. Fill level/fill strategy controller 198 can also generate control signals to move towing vehicle 108 to execute a desired fill strategy (such as a front-to-back fill strategy in container 118, a back-to-front fill strategy, a multi-pass fill strategy, etc.).

Propulsion subsystem 204 can include an engine and transmission that is used to drive ground engaging elements (such as wheels or tracks) on towing vehicle 108 to propel towing vehicle 108. Propulsion system 204 can also include individual motors that drive individual ground engaging elements or sets of ground engaging elements, or other propulsion mechanisms. Steering subsystem 206 can include steerable wheels or skid steer wheels or tracks that can be used to control the heading of towing vehicle 108. Power take off PTO 208 is illustratively a power takeoff mechanism driven by the engine of towing vehicle 108. Therefore, by controlling engine speed, the speed of rotation of PTO 208 can also be controlled.

Data store interaction system 174 in handoff control system 128 interacts with data store 150 to obtain the distance-related criteria 162. Thus, data store interaction system 174 can obtain any of the position-based criteria discussed above, or others.

Position parameter computation processor 176 performs any desired computations that are needed to determine whether the position-based criteria 162 are met. For instance, where the position-based criteria 162 include the path distance as described above with respect to FIG. 2, then path distance calculator 184 calculates the distance along path 112 that remains between material transfer vehicle 106 and container 108. Where the position-based criteria 162 include the straight line criterion described above with respect to FIG. 3, then straight line distance calculator 186 calculates the straight line distance between material transfer vehicle 106 and container 118. Where the position-based criteria 162 include a travel time criterion as discussed above with respect to FIG. 4, then travel time calculator 188 calculates the estimated travel time remaining for material transfer vehicle 106 to travel along navigation path 112 to reach container 118. Where the position-based criteria 162 include an unloading zone 144 as discussed above with respect to FIG. 5, then zone identifier 192 identifies the location of the boundaries of the unloading zone 144 that is to be used as the distance-based criterion. Where the distance-based criteria 162 include a specific location as discussed above with respect to FIG. 6, then location identifier 190 identifies that specific location that is to be used as the position-based criterion.

Once the position-based parameter is computed by position parameter computation processor 176, then comparison system 178 compares the parameter value(s) to threshold value(s) to determine whether a position-based criterion is met. For instance, where the path distance calculator 184 calculates the remaining path distance along path 112, and that is to be used as the position-based criterion, then comparison system 178 compares the path distance calculated by calculator 184 to a threshold path distance to determine when the material transfer vehicle 106 is within the path distance threshold (e.g., 140 as described in FIG. 2 above). If so, then the path distance criterion is met and handoff signal generator 180 generates a handoff signal indicating that auto unloading system 126 should begin controlling towing vehicle 108. Path distance calculator 184 can continuously or intermittently calculate new path distance values and comparison system 178 can compare those new path distance values against the threshold value on a continuous or intermittent basis as well.

Where the position-based criterion is the straight line distance r described above with respect to FIG. 3, then straight line distance calculator 186 calculates the straight line distance between material transfer vehicle 106 and container 118 and comparison system 178 compares that value to a threshold value r to determine whether material transfer vehicle 106 is within the threshold straight line distance of container 118. If so, then the position-based criterion is met and handoff signal generator 180 generates a handoff signal again indicating that auto unloading system 126 is to begin controlling towing vehicle 108. The straight line distance can be continuously or intermittently updated and compared by calculator 186 and comparison system 178, respectively.

Where the position-based criterion is a remaining travel time criterion, then travel time calculator 188 calculates the estimated travel time remaining for material transfer vehicle 106 to travel the remaining distance along travel path 112 to reach container 118. Again, the travel time can be estimated based on estimated speeds of towing vehicle 108, based upon the current speed of towing vehicle 108, among other things. The travel time is compared by comparison system 178 against a travel time threshold value to determine whether the remaining travel time calculated by calculator 188 meets the travel time threshold. If so, handoff signal generator 180 generates a handoff signal again indicating that unloading system 126 is to begin controlling towing vehicle 108.

Where the position-based criterion is a specific location, then location identifier 190 identifies that location and provides that location to comparison system 178 which compares that location against a current location of towing vehicle 108 output by location sensor 166. If the two locations are within a threshold distance of one another, then this indicates that the position-based criterion is met, and handoff signal generator 180 again generates a handoff signal indicting that auto unloading system 126 is to begin controlling towing vehicle 108. Where the position-based criterion includes an unloading zone (as described by zone 144 with respect to FIG. 5), then zone identifier 192 identifies the location of the boundaries of zone 144 and comparison system 178 determines whether a current location of towing vehicle 108 output by location sensor 166 is within the unloading zone 144. If so, then the position-based criterion is met and handoff signal generator 180 generates a handoff signal indicating that auto unloading system 126 is to begin controlling towing vehicle 108.

As mentioned, all of the values calculated by the position parameter computation processor 176 can be intermittently or continuously updated, and comparison system 178 can make intermittent or continuous comparisons as well.

On grain cart 110, sensors 212 can include any of a wide variety of different sensors. Sensors 212 can sense the position of auger 136, spout 138, and/or gate 134. Sensors 212 can generate an output indicative of a fill level of material in grain cart 110 and/or container 118.

Auger position actuator 214 drives the position of auger 136 relative to a frame of grain cart 110, such as between a stowed or transport position and a deployed, unload position. Spout position actuator 216 controls the position of spout 138 relative to auger 136 to change the trajectory of material exiting auger 136. Gate position actuator 217 moves gate 134 between its open position and closed position.

Figure 8:
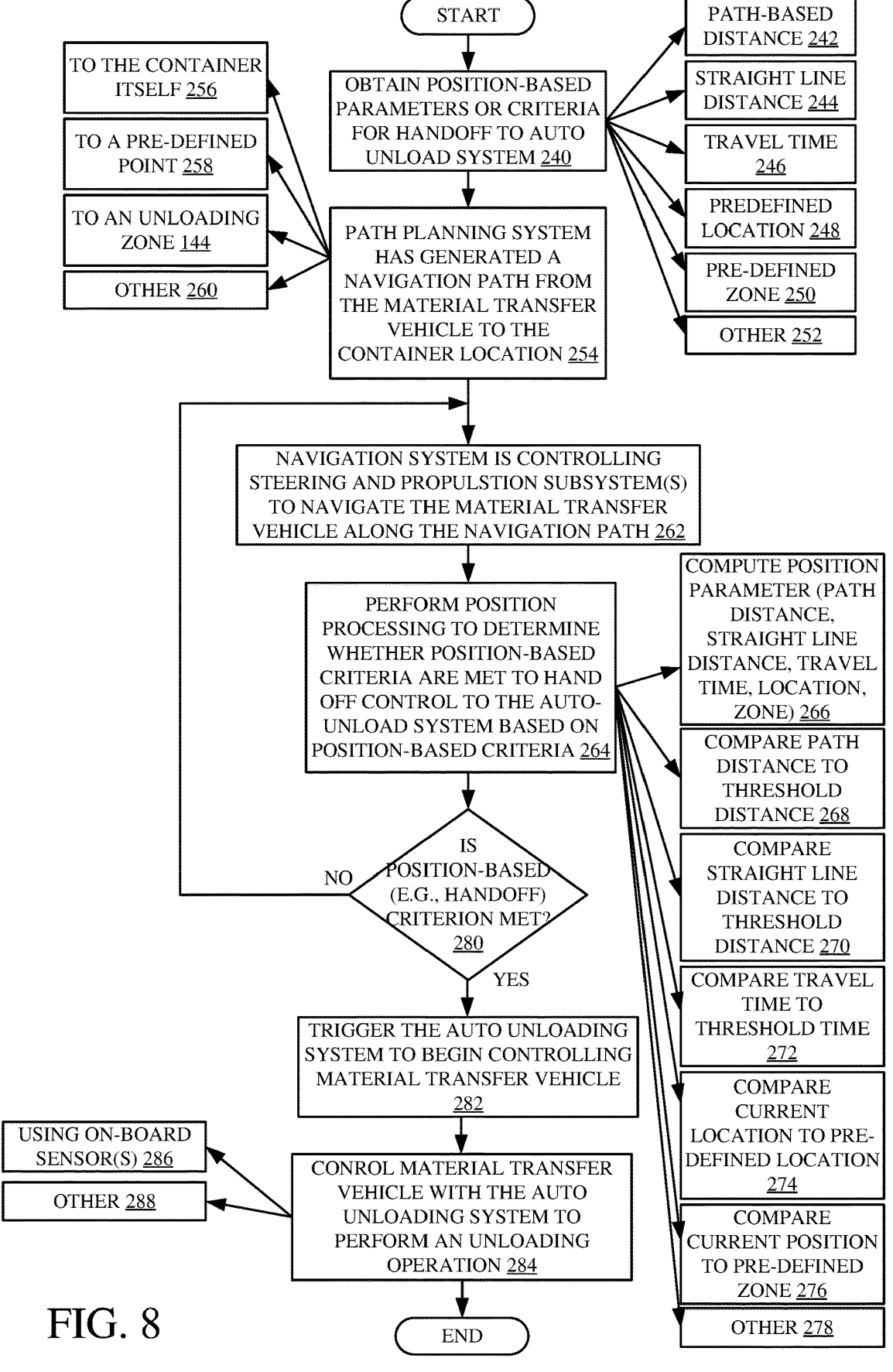
FIG. 8 is a flow diagram illustrating one example of the operation of a handoff control system in processing a position-based criterion to determine whether a navigation planning system or an auto unloading system should be controlling the material transfer vehicle.

FIG. 8 is a flow diagram illustrating one example of the operation of handoff control system 128. Data store interaction system 174 first obtains the position-based parameters or criteria that are to be met in order to handoff control to auto unloading system 126. Obtaining the position parameters or criteria is indicated by block 240 in the flow diagram of FIG. 8. As discussed above, the position-based criteria can include a path-based distance 242, a straight line distance 244, a travel time 246, a predefined location 248, or a predefined unloading zone 250, or other distance-based criteria 252.

During operation, it is first assumed that path planning system 124 has generated a navigation path 112 from material transfer vehicle 106 to the location of container 118, as indicated by block 254. The path 112 can be generated from material transfer vehicle 106 to the location of the container 118, itself, as indicated by block 256 or to a predefined point 258 that may be generated based upon an estimate of where container 118 will be. The path 112 can be to a predefined or dynamically generated unloading zone 144, or to another location generated in another way, as indicated by block 260.

Navigation system 130 then begins controlling controllable subsystems 158 to navigate towing vehicle 108 along the navigation path 112. Using navigation system 130 to navigate towing vehicle 108 along the navigation path 112 is indicated by block 262 in the flow diagram of FIG. 8.

Position parameter computation processor 176 then computes any parameters that are needed in order to determine whether the distance-based criteria are met. Performing position processing, in order to handoff control of towing vehicle 108 to auto unloading system 126 is indicated by block 264 in the flow diagram of FIG. 8. The position-based parameters are first computed, as indicated by block 266. Thus, path distance calculator 184 can calculate the path distance. Straight line distance calculator 186 can calculate the straight line distance. Travel time calculator 188 can calculate the travel time. Location identifier 190 can identify the predetermined location, and/or zone identifier 192 can identify a predetermined unloading zone.

Comparison system 178 then compares the calculated parameter to a threshold value in order to determine whether the position-based criterion is met. Thus, comparison system 178 compares the path distance to a threshold distance, as indicated by block 268. Comparison system 178 can compare the straight line distance to a threshold distance, as indicated by block 270. Comparison system 178 can compare the travel time to a threshold travel time as indicated by block 272. Comparison system 178 can compare a current location to a predefined location, as indicated by block 274. Comparison system 178 can compare a current location to the location of boundaries of a predefined zone, as indicated by block 276. Comparison system 178 can compare other computed parameters against other threshold values, as indicated by block 278. Based on the comparison value, comparison system 178 generates an output indicative of whether the handoff criterion (e.g., the position-based criterion) is met. This determination is indicated by block 280 in the flow diagram of FIG. 8.

If the handoff criterion is not met, then the navigation system 130 continues to control towing vehicle 108 and processing reverts to block 262 in the flow diagram of FIG. 8. However, if, at block 280, it is determined that the position-based (e.g., handoff) criterion is met, then handoff signal generator 180 generates an output signal triggering auto unloading system 126 to begin controlling material transfer vehicle 106, as indicated by block 282 in the flow diagram of FIG. 8. Auto unloading system 126 then controls the material transfer vehicle 106 to automatically perform an unloading operation, as indicated by block 284. The unloading operation can be performed, as discussed above, based on inputs from unloading operation sensors 170, as indicated by block 286, or in a wide variety of other ways, as indicated by block 288.

It can thus be seen that the present description describes a system that uses position-based parameters or criteria to determine when to switch between controlling a material transfer vehicle with a path planning and navigation system, and with an auto unloading system that may use on-board sensors to perform more precise positioning and unloading operations. The position-based criteria can be generated statically, generated and modified dynamically, or generated in other ways. This improves the accuracy and efficiency with which a handoff is made between the two control systems.

It will be noted that the above discussion has described a variety of different systems, components, calculators, identifiers, sensors, generators, and/or logic. It will be appreciated that such systems, components, calculators, identifiers, sensors, generators, and/or logic can be comprised of hardware items (such as processors and associated memory, or other processing components, some of which are described below) that perform the functions associated with those systems, components, calculators, identifiers, sensors, generators, and/or logic. In addition, the systems, components, calculators, identifiers, sensors, generators, and/or logic can be comprised of software that is loaded into a memory and is subsequently executed by a processor or server, or other computing component, as described below. The systems, components, calculators, identifiers, sensors, generators, and/or logic can also be comprised of different combinations of hardware, software, firmware, etc., some examples of which are described below. These are only some examples of different structures that can be used to form the systems, components, calculators, identifiers, sensors, generators, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
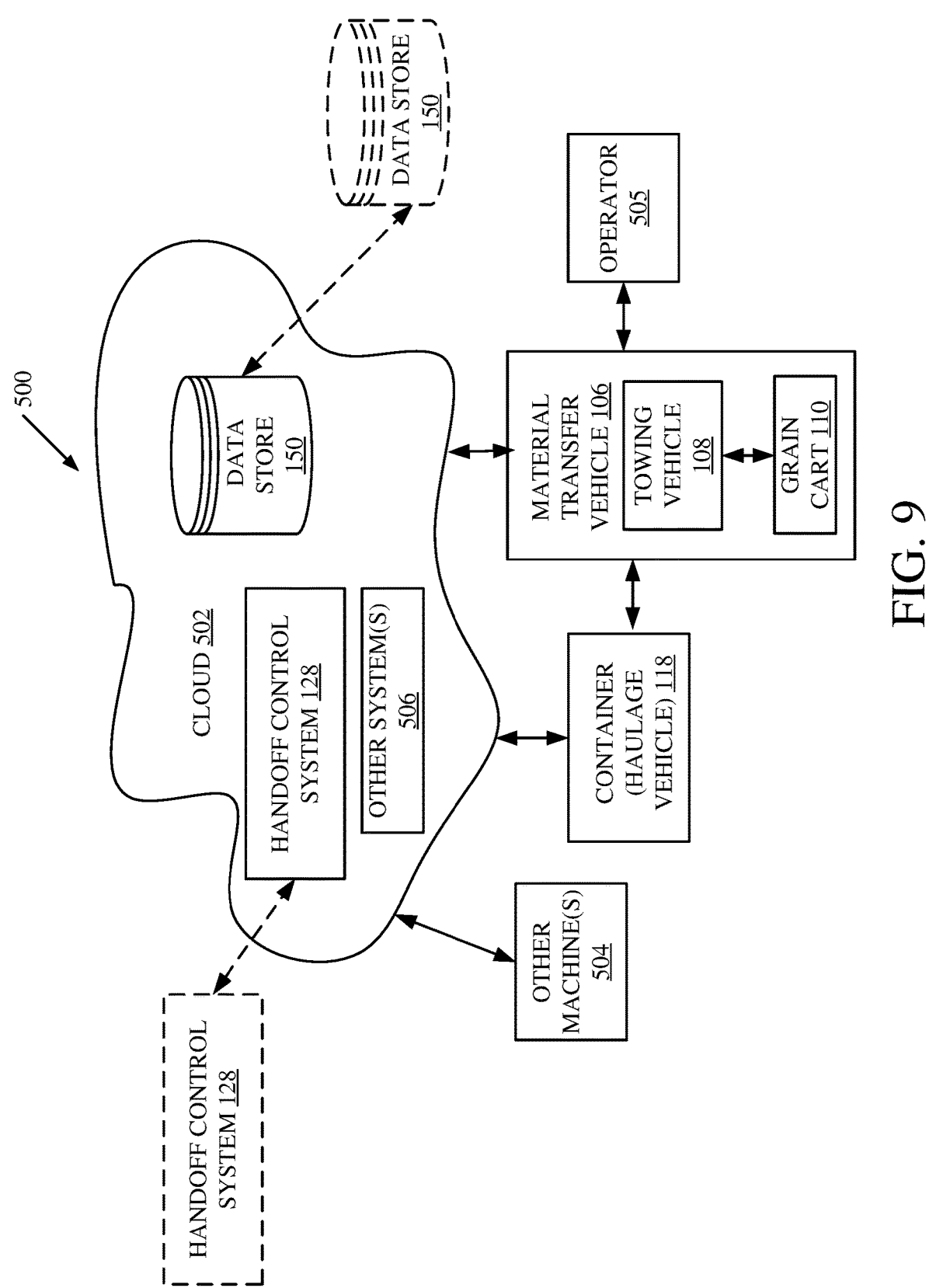
FIG. 9 is a block diagram showing one example of an agricultural system deployed in a remote server environment.

FIG. 9 is a block diagram of agricultural system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or the components and functions can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in other FIGS. and they are similarly numbered. FIG. 9 specifically shows that handoff control system 128 can be located in cloud 502 (which can be public, private, or a combination where portions are public while others are private). Therefore, vehicles 106, 118, other machines 504, and/or other systems 506 can access those systems through cloud 502. FIG. 9 also shows an operator 505 that can interact with vehicle 106.

FIG. 9 also depicts another example of a cloud architecture. FIG. 9 shows that it is also contemplated that some elements of system 100 can be disposed in cloud 502 while others are not. By way of example, handoff control system 128 and data store 150 can be disposed outside of cloud 502, and accessed through cloud 502. Regardless of where the items are located, the items can be accessed directly by the other vehicles and systems, through a network (either a wide area network or a local area network), the items can be hosted at a remote site by a service, or the items can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
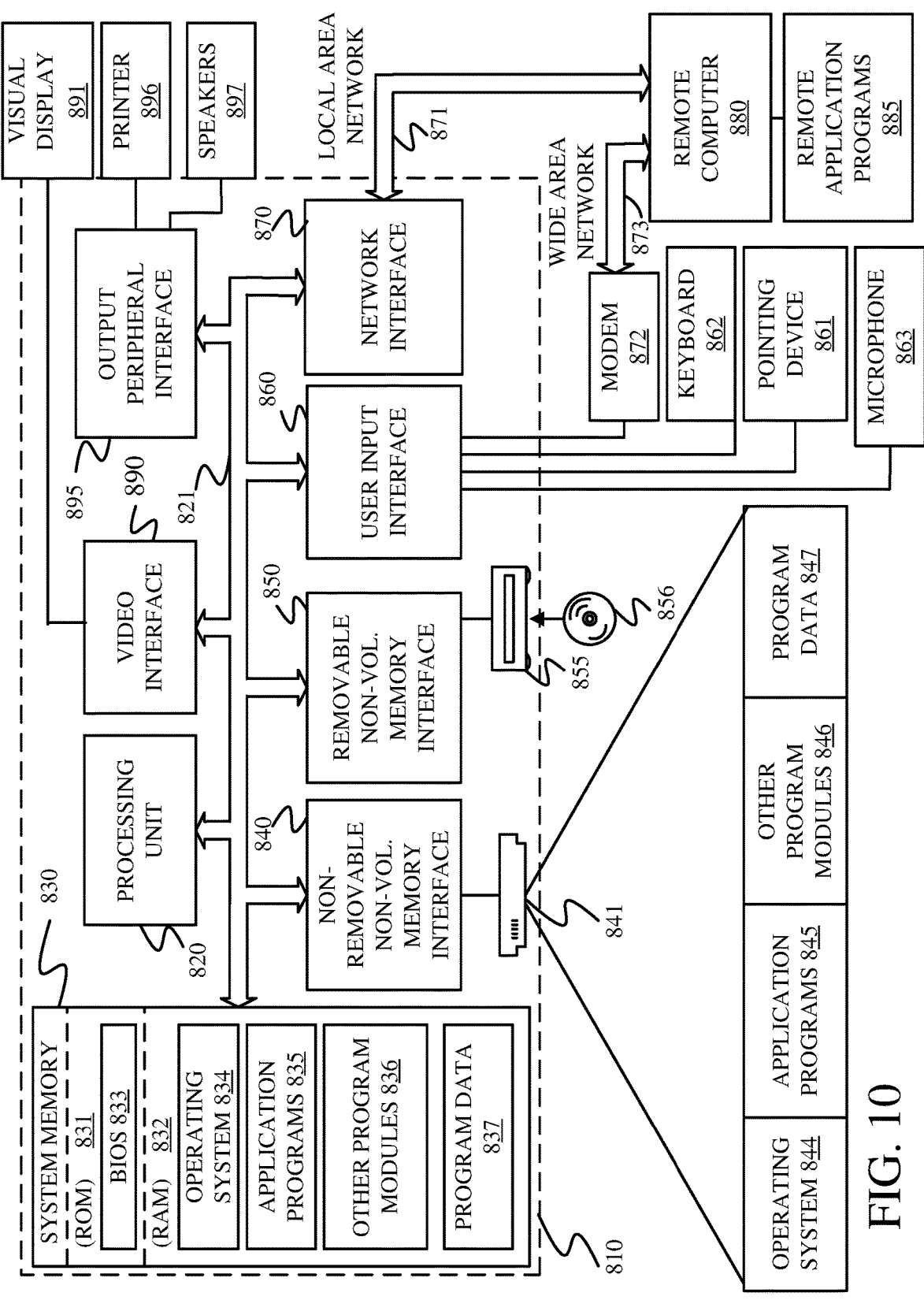
FIG. 10 is a block diagram of one example of a computing environment that can be used in the architectures and systems described in other figures.

FIG. 10 is one example of a computing environment in which system 100, or parts of it, (for example) can be deployed. With reference to FIG. 10, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to other FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a material transfer vehicle, the method comprising:
   controlling the material transfer vehicle with a navigation system based on a navigation path generated by a path planning system;
   computing a position-based parameter indicative of a characteristic of a position of the material transfer vehicle relative to a container;
   generating a handoff signal to handoff control of the material transfer vehicle to an auto unloading system based on a value of the position-based parameter; and
   controlling an unloading operation of the material transfer vehicle with the auto unloading system to automatically transfer material from the material transfer vehicle to a container based on the handoff signal.

2. The method of claim 1 wherein generating a handoff signal comprises:
   comparing the value of the position-based parameter to a threshold value to generate a comparison result;
   determining whether a handoff criterion is met based on the comparison result; and
   if the handoff criterion is met, generating the handoff signal to trigger the auto unloading system to begin controlling the material transfer vehicle.

3. The method of claim 2 wherein computing the position-based parameter comprises:
   detecting a path-based distance indicative of a distance remaining along the navigation path between the material transfer vehicle and the container.

4. The method of claim 3 wherein generating the handoff signal comprises:
   comparing the path-based distance to a path-based distance threshold to generate the comparison result;
   determining that the handoff criterion is met when the comparison result indicates that the path-based distance meets the path-based distance threshold; and generating the handoff signal to trigger the auto unloading system to begin controlling the material transfer vehicle.

5. The method of claim 2 wherein computing the position-based parameter comprises:

detecting a straight line distance indicative of a distance between the material transfer vehicle and the container along a straight line.

6. The method of claim 5 wherein generating the handoff signal comprises:

comparing the straight line distance to a straight line distance threshold to generate the comparison result;

determining that the handoff criterion is met when the comparison result indicates that the straight line distance meets the straight line distance threshold; and generating the handoff signal to trigger the auto unloading system to begin controlling the material transfer vehicle.

7. The method of claim 2 wherein computing the position-based parameter comprises:

detecting a travel time value indicative of a remaining travel time between the material transfer vehicle and the container along the navigation path.

8. The method of claim 7 wherein generating the handoff signal comprises:

comparing the travel time value to a travel time threshold to generate the comparison result;

determining that the handoff criterion is met when the comparison result indicates that the travel time value meets the travel time threshold; and generating the handoff signal to trigger the auto unloading system to begin controlling the material transfer vehicle.

9. The method of claim 2 wherein computing the position-based parameter comprises:

detecting a position of the material transfer vehicle.

10. The method of claim 9 wherein generating the handoff signal comprises:

comparing the position of the material transfer vehicle to a predefined location to generate the comparison result;

determining that the handoff criterion is met when the comparison result indicates that the position of the material transfer vehicle is within a threshold distance of the predefined; and generating the handoff signal to trigger the auto unloading system to begin controlling the material transfer vehicle.

11. The method of claim 9 wherein generating the handoff signal comprises:

comparing the position of the material transfer vehicle to a boundary of a predefined unloading zone to generate the comparison result;

determine that the handoff criterion is met when the position of the material transfer vehicle is within the boundary of the predefined unloading zone based on the comparison result;

generating the handoff signal to trigger the auto unloading system to begin controlling the material transfer vehicle.

12. An agricultural system, comprising:

a navigation system on a material transfer vehicle configured to receive a navigation path and control the material transfer vehicle based on a navigation path;

an auto unloading system configured to control an unloading operation of the material transfer vehicle to automatically transfer material from the material transfer vehicle to a container;

a position parameter computation processor configured to compute a position-based parameter indicative of a characteristic of a position of the material transfer vehicle relative to the container; and a handoff signal generator configured to generate a handoff signal to trigger the navigation system and the auto unloading system to control the material transfer vehicle based on the position-based parameter.

13. The agricultural system of claim 12 and further comprising:

a comparison system configured to compare a value of the position-based parameter to a threshold value to generate a comparison result, wherein the handoff signal generator is configured to determine whether a handoff criterion is met based on the comparison result, and if the handoff criterion is met, generating the handoff signal to trigger the auto unloading system to begin controlling the material transfer vehicle.

14. The agricultural system of claim 13 wherein the position parameter computation processor comprises:

a path distance calculator configured to detect a path-based distance indicative of a distance remaining along the navigation path between the material transfer vehicle and the container and wherein the comparison system is configured to compare the path-based distance to a path-based distance threshold to generate the comparison result, wherein the handoff signal generator is configured to determine that the handoff criterion is met when the comparison result indicates that the path-based distance meets the path-based distance threshold.

15. The agricultural system of claim 13 wherein the position parameter computation processor comprises:

a straight line distance calculator configured to detect a straight line distance indicative of a distance between the material transfer vehicle and the container along a straight line, wherein the comparison system is configured to compare the straight line distance to a straight line distance threshold to generate the comparison result and wherein the handoff signal generator is configured to determine that the handoff criterion is met when the comparison result indicates that the straight line distance meets the straight line distance threshold.

16. The agricultural system of claim 13 wherein the position parameter computation processor comprises:

a travel time calculator configured to detect a travel time value indicative of a remaining travel time between the material transfer vehicle and the container along the navigation path, wherein the comparison system is configured to compare the travel time value to a travel time threshold to generate the comparison result, and wherein the handoff signal generator is configured to determine that the handoff criterion is met when the comparison result indicates that the travel time value meets the travel time threshold.

17. The agricultural system of claim 13 wherein the position parameter computation processor comprises:

a location identifier configured to detect a position of the material transfer vehicle and a predefined location wherein the comparison system is configured to compare the position of the material transfer vehicle to a predefined location to generate the comparison result, wherein the handoff signal generator is configured to determine that the handoff criterion is met when the comparison result indicates that the position of the material transfer vehicle is within a threshold distance of the predefined.

18. The agricultural system of claim 13 wherein the position parameter computation processor comprises:

a zone identifier configured to detect a position of the material transfer vehicle and a boundary of a predefined loading zone, wherein the comparison system is configured to compare the position of the material transfer vehicle to the boundary of the predefined unloading zone to generate the comparison result, wherein the handoff signal generator is configured to determine that the handoff criterion is met when the position of the material transfer vehicle is within the boundary of the predefined unloading zone.

19. A material transfer vehicle, comprising:

a propulsion subsystem;

a steering subsystem;

an unloading conveyor;

a path planning system configured to generate a travel path from the material transfer vehicle to an unloading location;

a navigation system configured to receive the travel path and control the propulsion subsystem and the steering subsystem based on a navigation path;

an auto unloading system configured to control the propulsion subsystem, the steering subsystem, and the unloading conveyor to automatically transfer material from the material transfer vehicle to a container;

a position parameter computation processor configured to compute a position-based parameter indicative of a characteristic of a position of the material transfer vehicle relative to the container; and a handoff signal generator configured to generate a handoff signal to trigger one of the navigation system and the auto unloading system to control the material transfer vehicle based on the position-based parameter.

20. The material transfer vehicle of claim 19 and further comprising:

a comparison system configured to compare a value of the position-based parameter to a threshold value to generate a comparison result, wherein the handoff signal generator is configured to determine whether a handoff criterion is met based on the comparison result, and if the handoff criterion is met, generating the handoff signal to trigger the auto unloading system to begin controlling the material transfer vehicle.

* * * * *